US008279342B2

(12) United States Patent
Hasegawa et al.

(10) Patent No.: US 8,279,342 B2
(45) Date of Patent: Oct. 2, 2012

(54) SYSTEM FOR RECEIVING AND STORING BROADCAST CONTENT, AND DEVICE FOR RECEPTION AND STORAGE

(75) Inventors: Eiji Hasegawa, Kawasaki (JP); Naoki Nishiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1099 days.

(21) Appl. No.: 11/980,848

(22) Filed: Oct. 31, 2007

(65) Prior Publication Data

US 2008/0151110 A1 Jun. 26, 2008

(30) Foreign Application Priority Data

Dec. 26, 2006 (JP) ................................ 2006-349671

(51) Int. Cl.
*H04N 7/00* (2011.01)

(52) U.S. Cl. ......................... 348/466; 725/109; 709/217

(58) Field of Classification Search .................. 348/466; 725/87-118; 709/217-231
See application file for complete search history.

(56) References Cited

U.S. PATENT DOCUMENTS

| | | | | |
|---|---|---|---|---|
| 5,956,716 | A * | 9/1999 | Kenner et al. | 1/1 |
| 5,978,381 | A * | 11/1999 | Perlman et al. | 370/432 |
| 6,049,333 | A * | 4/2000 | LaJoie et al. | 715/718 |
| 6,211,901 | B1 * | 4/2001 | Imajima et al. | 725/93 |
| 6,665,706 | B2 * | 12/2003 | Kenner et al. | 709/203 |
| 6,947,973 | B2 * | 9/2005 | Shimura et al. | 709/217 |
| 2002/0154892 | A1 * | 10/2002 | Hoshen et al. | 386/87 |
| 2005/0034156 | A1 | 2/2005 | Terui | |
| 2005/0084038 | A1 | 4/2005 | Kanda | |

FOREIGN PATENT DOCUMENTS

| | | |
|---|---|---|
| EP | 1 643 711 | 4/2006 |
| JP | 2002-084239 | 3/2002 |
| JP | 2004-274561 | 9/2004 |
| WO | WO 02/23791 | 3/2002 |

* cited by examiner

*Primary Examiner* — Annan Shang
(74) *Attorney, Agent, or Firm* — Greer, Burns & Crain, Ltd.

(57) ABSTRACT

In a system for receiving and storing broadcast content data, a reception and storage device receives and stores a portion of broadcast content data in a storage unit, and then generates and stores a first piece of error check data for the data portion. The reception and storage device receives, from a further device, a second piece of error check data for a portion of the broadcast content data corresponding to the data portion stored in the storage unit, compares the first piece of error check data with the second piece of error check data to determine whether the first piece of error check data is valid, receives, if the first piece of error check data is determined to be invalid, the corresponding data portion associated with the second piece of error check data, from another reception and storage device, and corrects the stored data portion in the storage unit based on the received corresponding data portion.

17 Claims, 16 Drawing Sheets

ERROR CHECK DATA
FOR STORED VIDEO DATA

| Time Stamps | CRC |
|---|---|
| 10000-19999 | A23C |
| 20000-29999 | C328 |
| 30000-39999 | 98E3 |

EXAMPLE OF LIST OF DEVICES IN MANAGEMENT NODE

| DEVICE ID | IP ADDRESS | STORAGE RANGE TIME STAMPS | DATE & TIME OF PREVIOUS USE | NUMBER OF ISSUED ENCRYPT. KEYS |
|---|---|---|---|---|
| Device-A | 198.21.3.45 | 100000-215000 | 2006/10/1/19:30:01 | 0 |
| Device-B | 201.12.3.11 | 101000-217000 | 2006/10/2/0:12:34 | 3 |
| Device-C | 87.29.87.12 | 98000-216000 | 2006/10/1/15:12:15 | 1 |

INFORMATION ON ISSUED KEYS

| | NUMBER OF ISSUED KEYS |
|---|---|
| DEVICE30 | 0→1 |

LIST OF KEYS FOR CONTENT
(PAIR OF PUBLIC & PRIVATE KEYS)

| TIME STAMPS | PAIR OF KEYS |
|---|---|
| 10000-19999 | KEY PAIR a |
| 20000-29999 | KEY PAIR b |
| 30000-39999 | KEY PAIR c |
| 40000-49999 | KEY PAIR d |

SYSTEM FOR RECEIVING AND STORING BROADCAST CONTENT, AND DEVICE FOR RECEPTION AND STORAGE

FIELD OF THE INVENTION

The present invention relates to error correction of received broadcast program content data, and in particular relates to error correction of wireless-broadcast program content data which is received and stored by a broadcast program reception and storage device, by accessing over a network to corresponding broadcast program content data which is stored in another broadcast program reception and storage device.

BACKGROUND OF THE INVENTION

Under the circumstances of wide-spreading use of HDD recorders, possible forms of server-type broadcasting services, which can be provided to a broadcast program receiver with a storage unit including an HDD recorder, have been studied. The server-type broadcasting services allow such a broadcast program receiver to receive and store, in its storage unit, broadcast audio/video (A/V) stream data and/or associated information data for different broadcast content programs, and allow a desired one of the received content programs in the storage unit to be reproduced. The server-type broadcasting services typically include types I and II of broadcasting services. The type I of server-type broadcasting services broadcast instantly reproducible and displayable A/V stream data and associated metadata which are adapted for storage. The type II of server-type broadcasting services broadcast A/V stream data and associated metadata of broadcast content programs for storage repeatedly in a data carousel manner, so that the broadcast stream data and metadata are stored in a storage unit of such a receiver, and then a content program of the stored A/V stream data is presented on a presentation unit of such a receiver.

In Japanese Patent Application Publication JP 2002-84239-A published on Mar. 22, 2002, Onishi et al. describe a media information distribution system. In the media information distribution system, for multicast program distribution over the Internet or an intranet and for multicast information distribution using a digital broadcast satellite/communication satellite, a receiver device stores distributed information, detects a position of the information where a transmission error occurs, requests a transmitter device to re-transmit a portion of information related to the transmission error and receives the portion to correct the transmission error of the stored distributed information. Thus, the media information distribution system secures the real time performance of the multicast program distribution and the reliability of the stored information.

In Japanese Patent Application Publication JP 2004-274561-A published on Sep. 30, 2004, Kubota describes a broadcast receiver device. When the defective reception occurs during the reception of a recorded program, the broadcast receiver device automatically detects the occurrence of the defective reception, generates information related to the defective reception indicative of a time of the defective reception occurrence and of a program content portion affected by the defective reception, transmits the generated defective reception portion information to a server via a network, and acquires restoration information for restoring the defective reception portion, so that all the program content can be viewed without being affected by the defective reception portion of the recorded content due to the defective reception of a broadcast RF signal during the recording.

SUMMARY OF THE INVENTION

In accordance with an aspect of the present invention, a system for receiving and storing broadcast content data includes a plurality of reception and storage devices which receive and store broadcast content data. Each of the plurality of reception and storage devices includes: a receiver which receives the broadcast content data, a processor, a storage unit which stores the received broadcast content data, and a communication unit. Each of the plurality of reception and storage devices receives at least a portion of the broadcast content data and stores the received data portion in the storage unit, and then generates a first piece of error check data for the received data portion and stores the generated first piece of error check data in association with the received data portion in the storage unit. One of the plurality of reception and storage devices, under the control of the processor thereof, receives, from a further device over the network, a second piece of error check data for a portion of the broadcast content data corresponding to the data portion stored in the storage unit, compares the first piece of error check data with the second piece of error check data to determine whether the first piece of error check data is valid, receives the corresponding data portion associated with the second piece of error check data from another one of the plurality of reception and storage devices, if the first piece of error check data is determined to be invalid, and corrects the stored data portion in the storage unit based on the received corresponding data portion.

The invention also relates to a reception and storage device and a program for use in the system for receiving and storing broadcast content data described above.

The invention will be described in connection with non-limiting embodiments with reference to the accompanying drawings. Throughout the drawings, similar symbols and numerals indicate similar items and functions.

DESCRIPTION OF PREFERRED EMBODIMENTS

A broadcast RF signal from a broadcast station may be subject to a reception error or an interference due to weather conditions and/or other factors, when it is received by a reception and storage device. However, the reception and storage device cannot make a request to the broadcast station for retransmission of data having a reception error. Accordingly, the reception and storage device cannot reproduce program content containing a reception error carried by a RF signal of the type I of server-type broadcasting services and of the normal wireless broadcasting services. In the type II of server-type broadcasting services, in order to reproduce a broadcast content program containing a reception error carried by an RF signal, the reception and storage device must keep on receiving the broadcast RF signal until the data related to a reception error is redistributed in another cycle. In the broadcasting services in the data carousel manner, the retransmission cycle basically varies proportionately with a size of a broadcast data file, and hence broadcast content program containing a large-size file, such as A/V content, has a long retransmission cycle. If the broadcast station retransmits stream data representing a portion of the content program in response to a request for retransmission by a reception and storage device, the load of processing the retransmission in the broadcast station is excessively increased.

The inventors have recognized that it is advantageous to allow a plurality of reception and storage devices to correct an error of received broadcast program content data between or among them over a network without making a request to a broadcast station for retransmission of a portion of the broadcast program content data.

It is an object of the present invention to allow correction of an error in broadcast program content data stored in a reception and storage device based on corresponding broadcast program content data from a further device.

According to the invention, an error in broadcast program content data stored in a reception and storage device can be corrected based on corresponding broadcast program content data from a further device.

Figure 1:
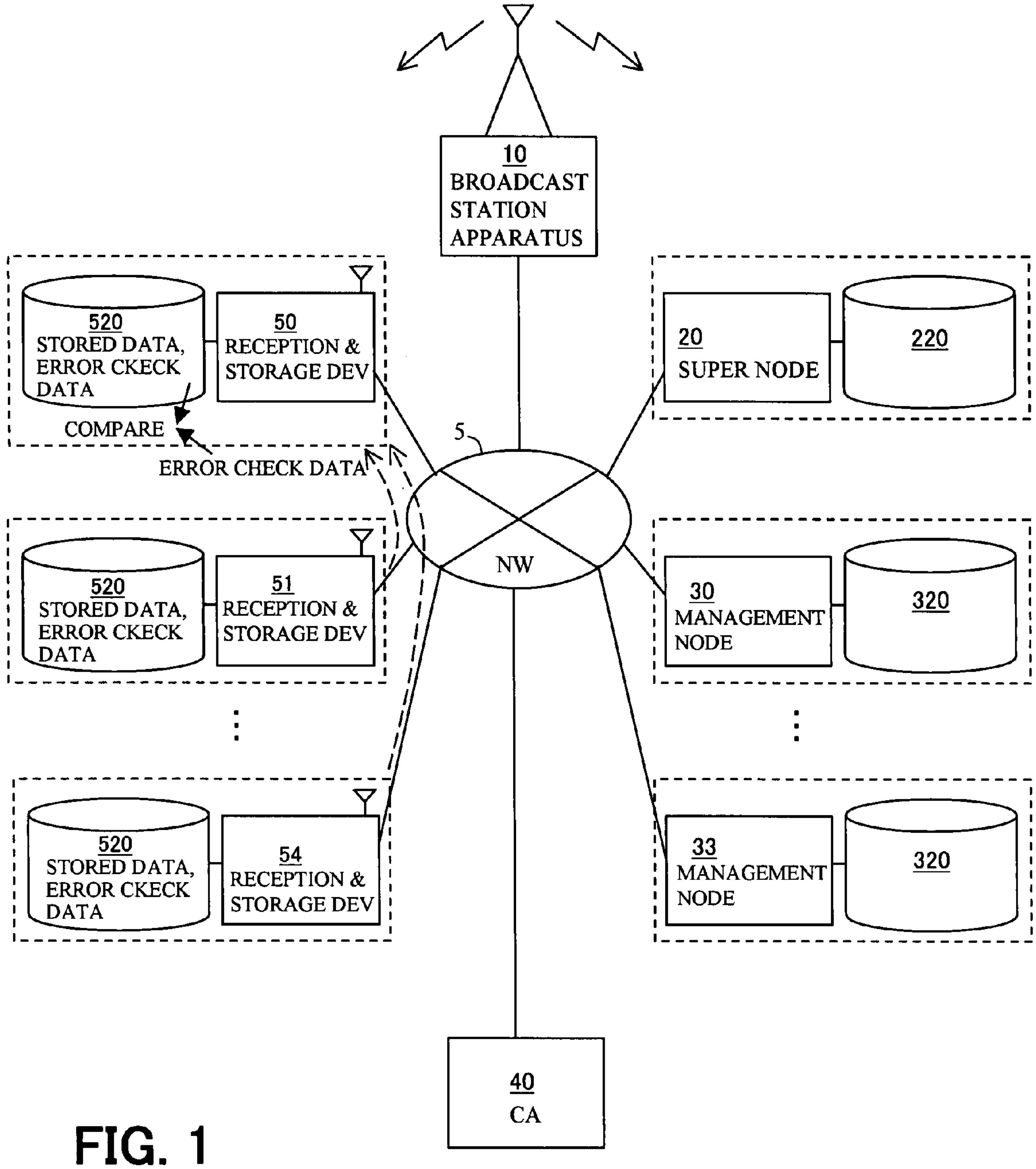
FIG. 1 shows a system for broadcasting and receiving a broadcast content program, in accordance with an embodiment of the present invention.

FIG. 1 shows a system for broadcasting and receiving a broadcast content program, in accordance with an embodiment of the present invention. The system for broadcasting and receiving a broadcast content program includes: a broadcast station apparatus 10 connected to a network 5, such as the Internet, for wirelessly broadcasting an RF signal which carries broadcast program content data and associated information (hereinafter, also simply referred to as "program content data") in the form of an audio/video (A/V) data stream; a plurality of reception and storage devices 50, 51, . . . 54 for receiving and storing a broadcast RF signal which carries such wireless broadcast program content data and associated information; a plurality of management nodes 30, . . . 33 for managing these reception and storage devices and their related information; a super node 20 for managing the management nodes 30-33; and a certificate authority apparatus 40. Each of the reception and storage devices 50, 51, . . . 54 stores data, such as broadcast program content data, and also associated error check or correction data in a storage unit 520. The super node device 20 has a storage unit 220. Each of the management node devices 30, . . . 33 has a storage unit 320. The super node device 20 may also serve as a management node or as a reception and storage device.

According to the principle of the invention, the reception and storage device 50 is configured to correct its erroneous data portion and associated error check or verification data in a broadcast content program stored in the storage unit 520. For this purpose, the reception and storage device 50 compares the error check data of each portion of the program content data stored in the storage unit 520 with an error check data of a corresponding portion of the same program content data stored in any of the other reception and storage devices 51-54. Then, if it is determined that there is an error in any of portions in the stored program content data, the reception and storage device 50 receives, over the network 5, the corresponding correct data portion and its error check data from any of the reception and storage devices 51-54. Thus, with reference to the received correct data portion and error check data, the reception and storage device 50 corrects its erroneous data portion and error check data of the content program stored in the storage unit 520. The error check data may be data calculated in an error detection scheme such as CRC, Hash method, SHA-1. Each of the other reception and storage devices 51-54 has a configuration similar to the reception and storage device 50.

Figure 2A:
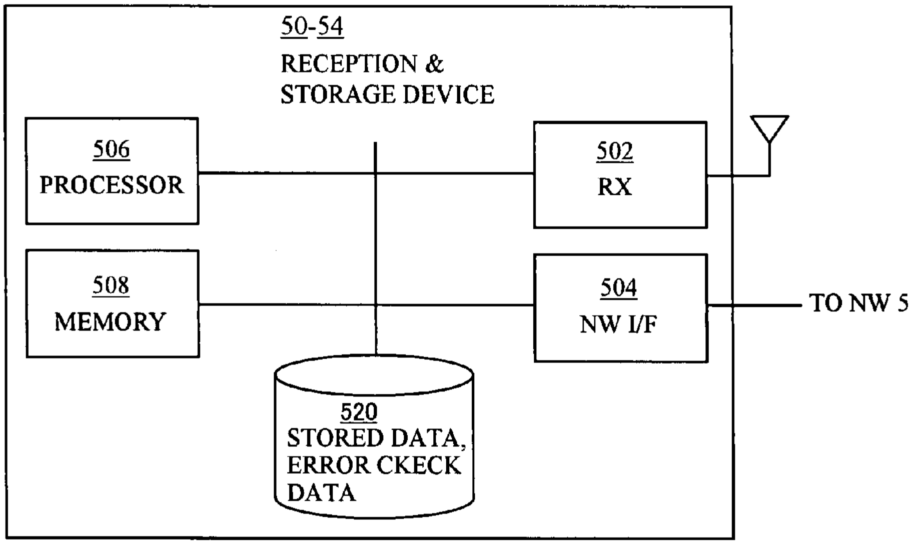
FIG. 2A shows a configuration of the reception and storage device.

FIG. 2A shows a configuration of the reception and storage device 50. The reception and storage device 50 includes: a wireless broadcast receiver (RX) 502 for receiving a broadcast RF signal which carries an A/V data stream from the broadcast station apparatus 10, a network interface (NW I/F)

or communication unit 504 connected to the network 5, a processor 506, a memory 508, and the storage unit 520 for storing received broadcast program content data, associated information data (i.e., metadata), and error check data for different portions of the program content data. The functions of the processor 506 may be implemented by executing programs stored in the memory 508, or may be implemented in the form of hardware as a dedicated integrated circuit.

Figure 2B:
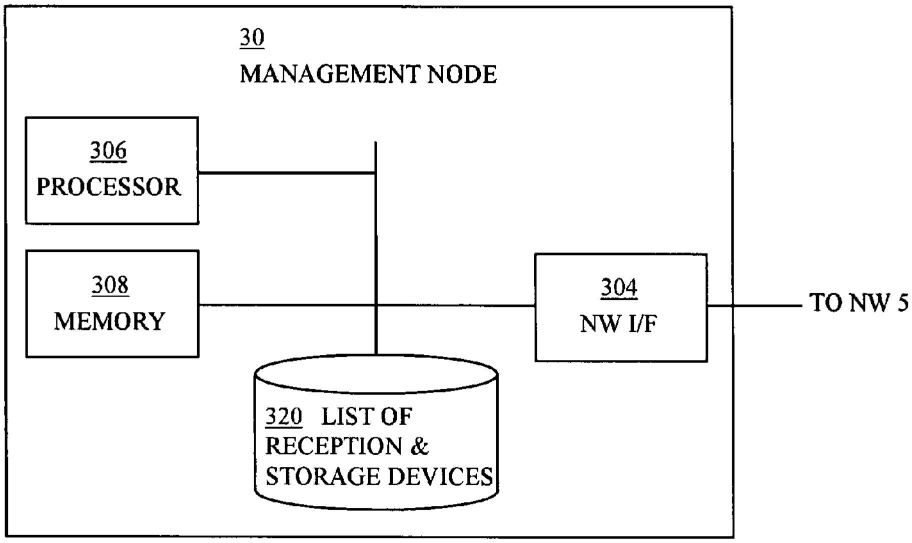
FIG. 2B shows a configuration of the management node device.

FIG. 2B shows a configuration of the management node device 30. The management node device 30 includes: a network interface (NW I/F) or communication unit 304 connected to the network 5, a processor 306, a memory 308, and the storage unit 320 for storing a list of the reception and storage devices and their related information. The functions of the processor 306 may be implemented by executing programs stored in the memory 308, or may be implemented in the form of hardware as a dedicated integrated circuit.

Figures 3A, 3B:
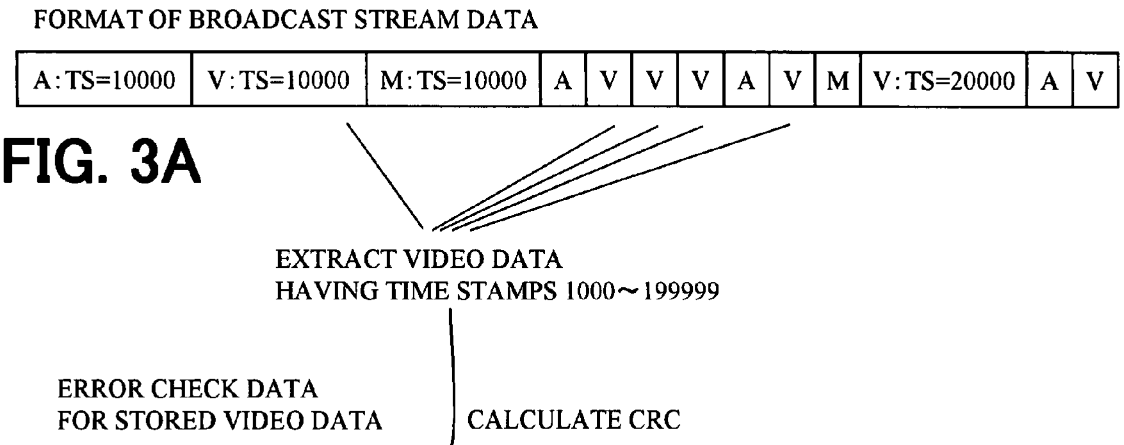
FIG. 3A shows a format of broadcast stream data.
FIG. 3B shows exemplary error check data for video data stored in the reception and storage device.

FIG. 3A shows a format of broadcast stream data. FIG. 3B shows exemplary error check data for video data stored in the reception and storage device 50 in the storage unit 520. The broadcast stream data includes a plurality of data packets such as audio data A, video data V and metadata M, and further includes, as a header thereof, time stamps of these pieces of data. The reception and storage device 50 (the processor 506) calculates error check data in the CRC scheme for each of a set of audio data A, a set of video data V, and a set of metadata M which are contained in the stored stream data within predetermined ranges of time stamps (e.g., 10000-19999, and 20000-29999), so that the calculated error check data is stored in association with each of the sets of data A, V and M.

Figures 4A, 4B:
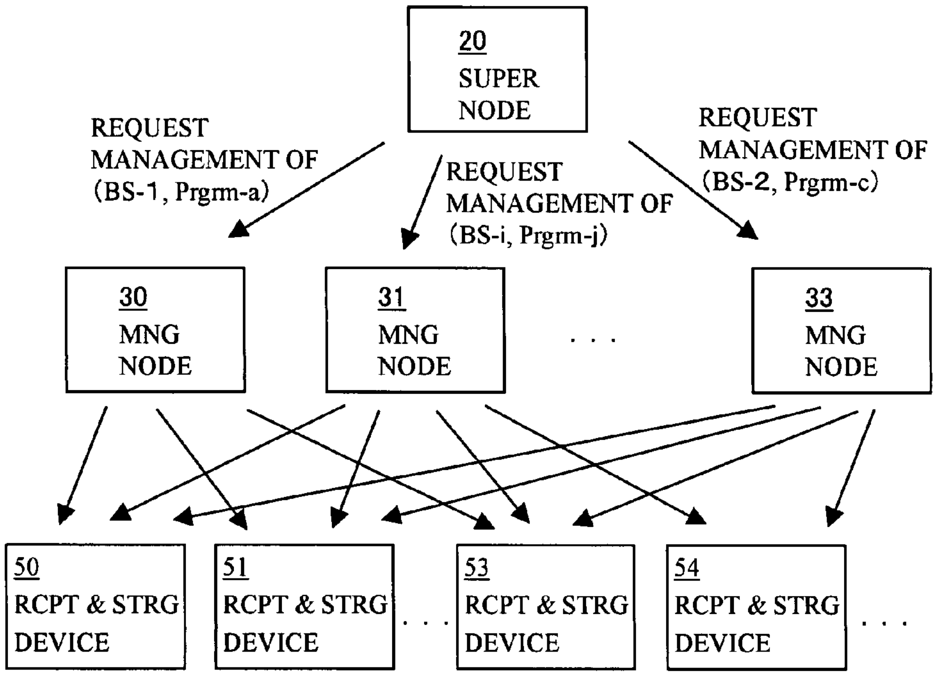
FIG. 4A shows a hierarchy of the super node, the management nodes and the reception and storage devices.
FIG. 4B shows an example of a list of the reception and storage devices and storage ranges thereof, which are stored in the storage unit of one of the management nodes.

FIG. 4A shows a hierarchy of the super node 20, the management nodes 30-33 and the reception and storage devices 50-54. FIG. 4B shows an example of a list of the reception and storage devices and storage ranges thereof, which are stored in the storage unit 320 of one of the management nodes 30-33.

Referring to FIG. 4A, the super node 20 manages requirements and conditions for managing the plurality of management nodes 30-33. In response to a request by the super node 20, each of the management nodes 30-33 starts storing and managing a list of the reception and storage devices 50-54 and their related information in the storage unit 320 for respective data storage states of particular programs of particular ones of the broadcast stations. The super node 20 sends, over the network 5, a request to each of the management nodes 30-33 for management of identifications of the broadcast stations (e.g., BS-i) and identifications of the programs to be broadcasted therefrom (e.g., Prgrm-j). For a particular program of a particular broadcast station, each of the management nodes 30-33 manages, in the list of the reception and storage devices, IDs, IP addresses, ranges of time stamps of stored content data, dates and times of the previous accesses to that management node, and the total number of encryption keys issued to each of the reception and storage devices. At an appropriate timing such as when a change has occurred in the stored data, each of the reception and storage devices 50-54 sends the storage information, such as an ID, an IP address and ranges of time stamps of the stored content data, to corresponding one or ones of the management nodes 30-33. Such a change may occur, for example, when storing a broadcast program is completed, when a change has occurred in storage information of a broadcast program, when data error is detected in a stored broadcast program, or when reproduction of a stored broadcast program is started. Then, the storage information is stored in the storage unit 320 of each of the corresponding one or ones of the management nodes 30-33.

Figure 5:
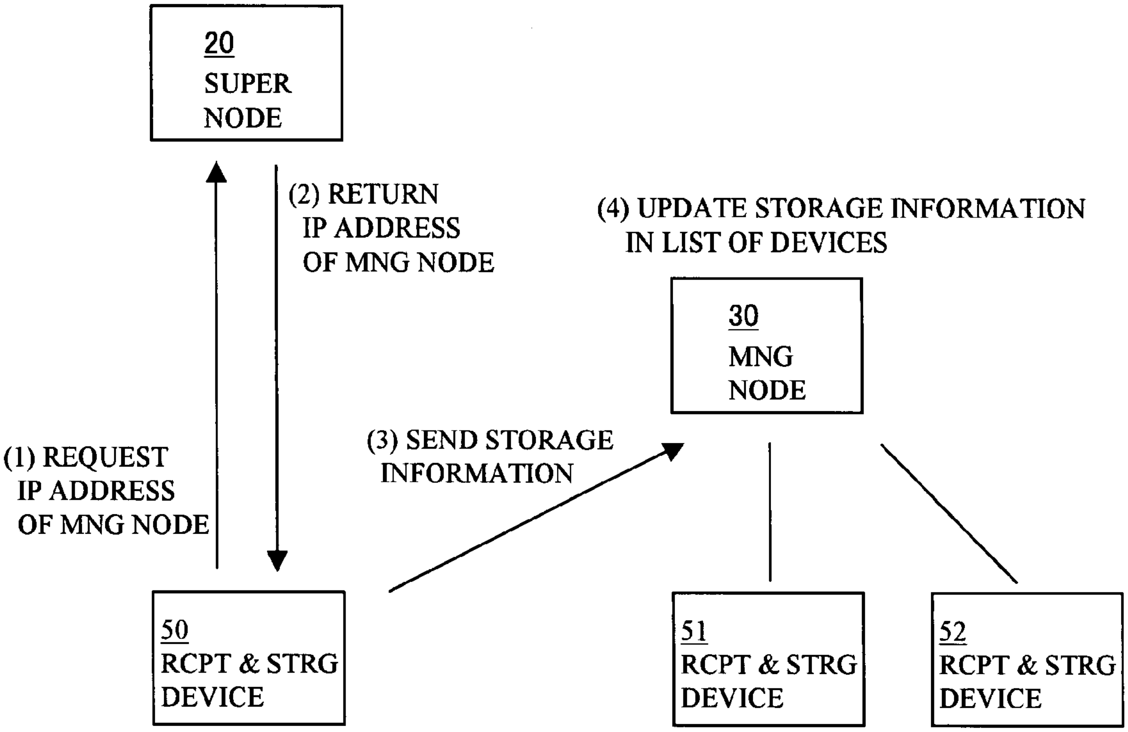
FIG. 5 shows processes, in which the reception and storage device, which has received a broadcast content program, sends current storage information for the stored program content data to the management node, and then the management node updates the storage information in the list of reception and storage devices.

FIG. 5 shows processes (1) through (4), in which the reception and storage device 50, which has received a broadcast content program, sends current storage information for the stored program content data to the management node 30, and then the management node 30 updates the storage information in the list of reception and storage devices.

Upon completion of storing the broadcast content program, the reception and storage device 50 makes an inquiry over the network 5 to the super node 20 for an IP address of the management node which manages the content program stored in the storage unit 520 (1), and then receives the IP address (2) from the super node 20. The reception and storage device 50 then sends, over the network 5, its current storage information to the management node 30 at the received IP address (3). The management node 30 updates the storage information of the reception and storage device 50 in the list of reception and storage devices (4). The other reception and storage devices 51-54 operate similarly.

Figure 6:
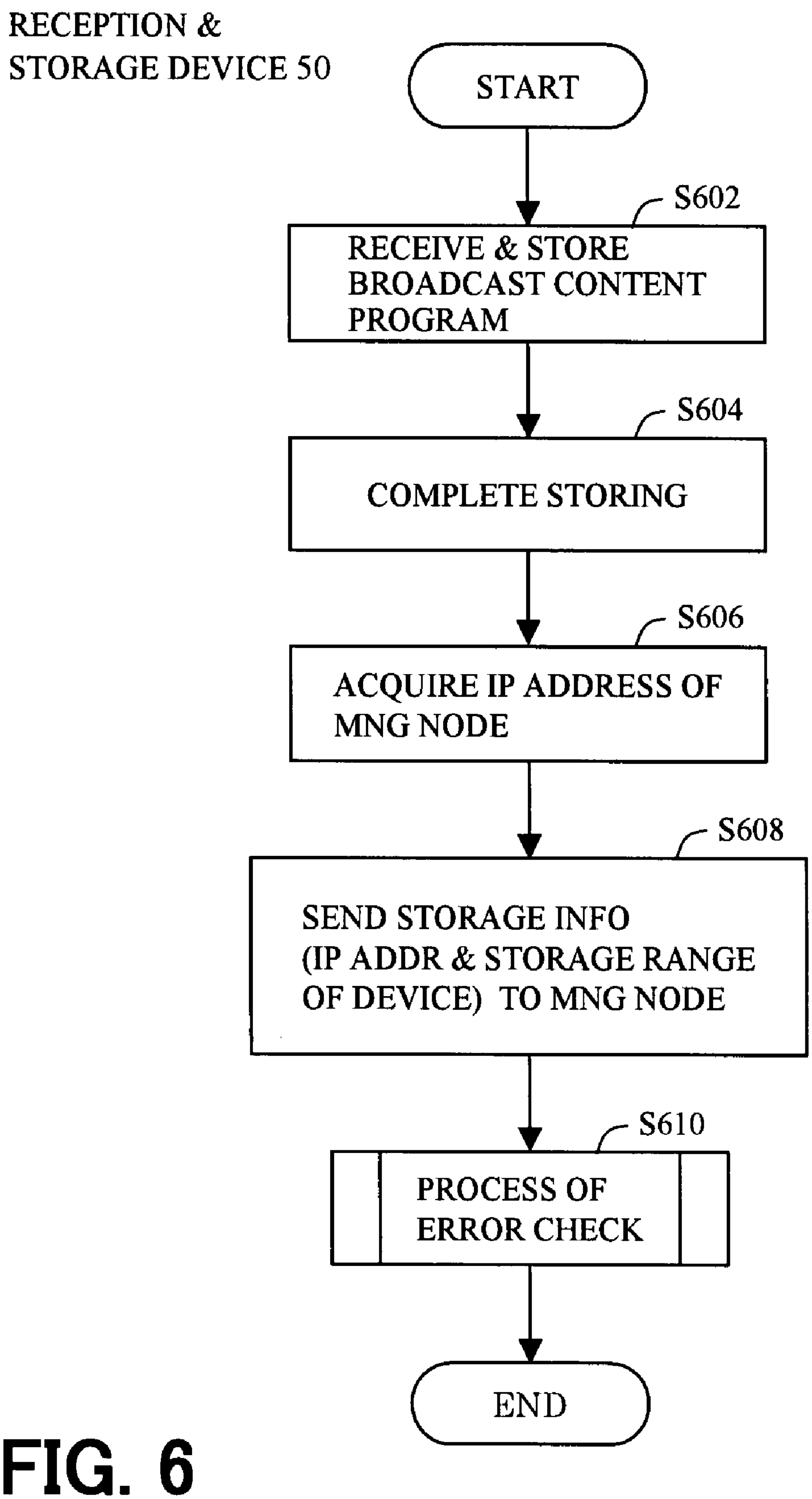
FIG. 6 shows a flow chart of a process for storage and error check of a broadcast content program, which is executed by each of the reception and storage devices.

FIG. 6 shows a flow chart of a process for storage and error check of a broadcast content program, which is executed by each of the reception and storage devices 50-54 (the processor 506).

At Step 602, the processor 506 of the reception and storage device 50 allows the wireless broadcast receiver 502 to receive a data stream representing the broadcast content program that is carried by a broadcast RF signal, and stores the received data stream in the storage unit 520. The processor 506 at Step 604 completes the storing of the data stream, and at Step 606 accesses the super node 20 at a known IP address through the network interface 504 over the network 5 and acquires an IP address of the management node 30 responsible for the management of the broadcast content program. At Step 608, the processor 506 sends, through the network interface 504 over the network 5 to the management node 30, the current or changed storage information of the reception and storage device 50, such as the identification (ID), the IP address, and the data storage range of the reception and storage device 50. At Step 610, the processor 506 performs a process of error check on the received and stored program content data, which will be described in more detail later.

Figure 7:
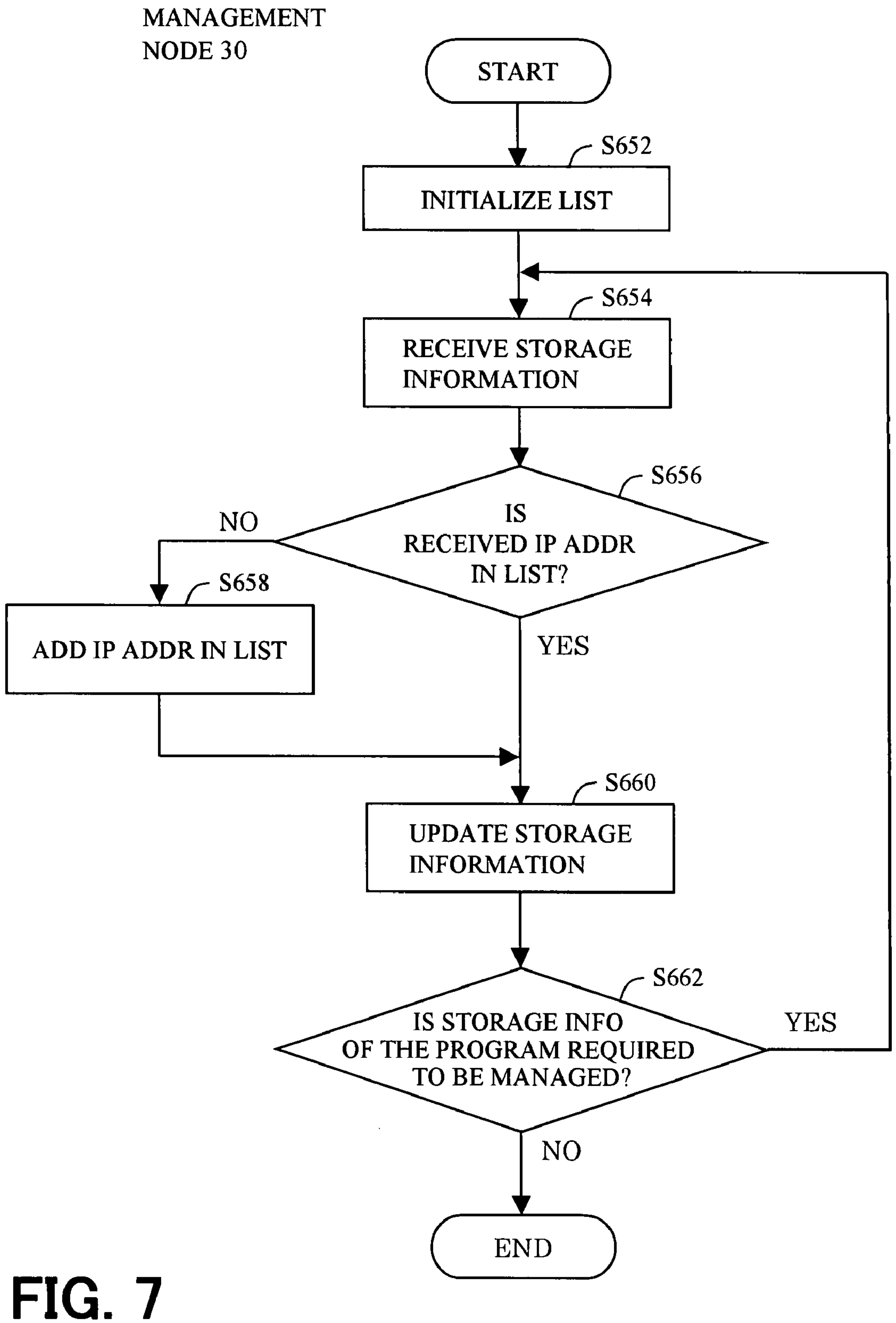
FIG. 7 shows a flow chart of a process for management of a list of reception and storage devices, which is executed by each of the management nodes.

FIG. 7 shows a flow chart of a process for management of a list of reception and storage devices 50-54, which is executed by the processor 306 of each of the management nodes 30-33.

At Step 652, the processor 306 of the management node 30 initializes a list of the reception and storage devices 50-54 stored in the storage unit 320. At Step 654, the processor 306 waits for reception of storage information of a broadcast content program from any one of the reception and storage devices 50-54, and then receives the storage information through the network interface 304 over the network 5. At Step 656, the processor 306 determines whether the list contains an IP address matched with a received IP address of a reception and storage device associated with the received storage information. If it is determined that the list contains a matched IP address, the procedure proceeds to Step 660. If it is determined that the list does not contain a received IP address, the processor 306 at Step 658 adds the received IP address to the list. At Step 660 following Step 656 or Step 658, the processor 306 updates the storage information of the reception and storage device in the list. At Step 662, the processor 306 determines whether the storage information of the broadcast content program is still required to be managed. If it is determined that the storage information is not required to be managed, the procedure exits this subroutine. If it is determined that the storage information is still required to be managed, the procedure returns to Step 654.

Figure 8:
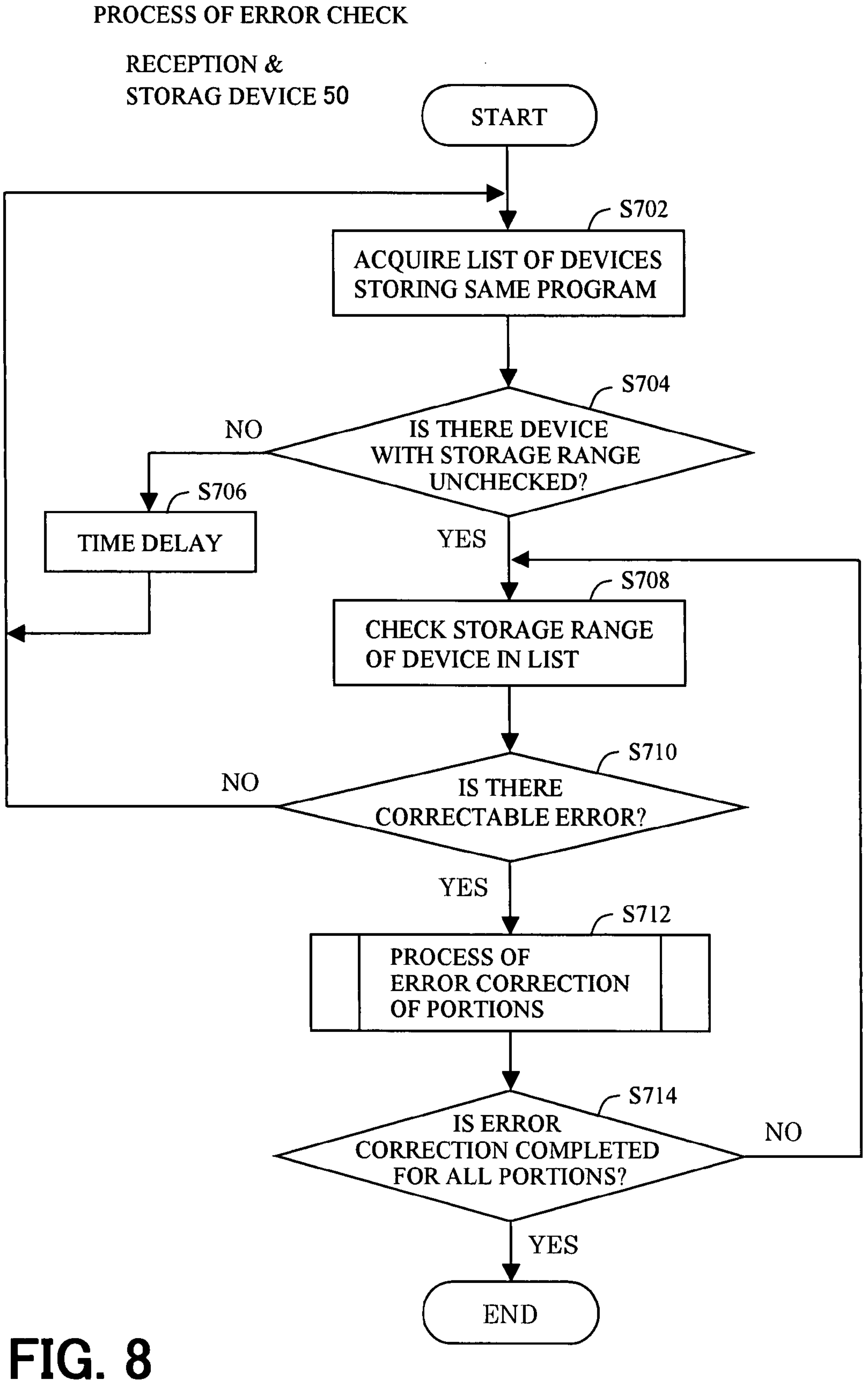
FIG. 8 shows a flow chart of a process for error check (Step 610 in FIG. 6) which is executed by the processor of each of the reception and storage devices.

FIG. 8 shows a flow chart of a process for error check (Step 610 in FIG. 6) which is executed by the processor 506 of each of the reception and storage devices 50-54.

At Step 702, the processor 506 of the reception and storage device 50 acquires, through the network interface 504 over the network 5 from the management node 30, the list of reception and storage devices storing the same storage ranges of corresponding pieces of the program content data. For this purpose, the processor 506 may send, to the management node 30, the IP address of one or more of the reception and storage devices associated with the storage information which it has already acquired. Preferably, the management node 30 sends an IP address, a storage range, and last access date and time of each of at least one or a predetermined number of the reception and storage devices that have the earliest, last access dates and times from the list of the reception and storage devices, excluding the storage information of the reception and storage devices having the sent IP addresses which the reception and storage device 50 has already acquired. Alternatively, the management node 30 may send IP addresses, storage ranges, and last access dates and times of all the remaining reception and storage devices in the list that the management node 30 does not acquired. This prevents the load of processing from being concentrated on one particular reception and storage device. After sending the IP address or addresses, the management node 30 updates the last access dates and times in the list for the sent storage information of the reception and storage devices.

At Step 704, the processor 506 determines whether there is any reception and storage device which has an unchecked storage range of the program content data in the list of reception and storage devices and their related information. If there is no reception and storage device which has an unchecked storage range, the procedure returns to Step 702 after a predetermined time delay at Step 706.

If it is determined at Step 704 that there is a reception and storage device which has an unchecked storage range, the processor 506 at Step 708 checks the unchecked storage range of such a reception and storage device. At Step 710, the processor 506 determines whether there is any data portion in this storage range that has an error which can be corrected. If it is determined that there is no data portion having a correctable error, the procedure returns to Step 702. If it is determined at Step 710 that there is a data portion having a correctable error, the processor 506 at Step 712 performs a process of error correction on this data portion. At Step 714, the processor 506 determines whether the required error correction has been completed for all the portions of the stored program content data. If it is determined that the required error correction has not been completed, the procedure returns to Step 708. If it is determined that the required error correction has been completed, the procedure exits this subroutine.

Figure 9:
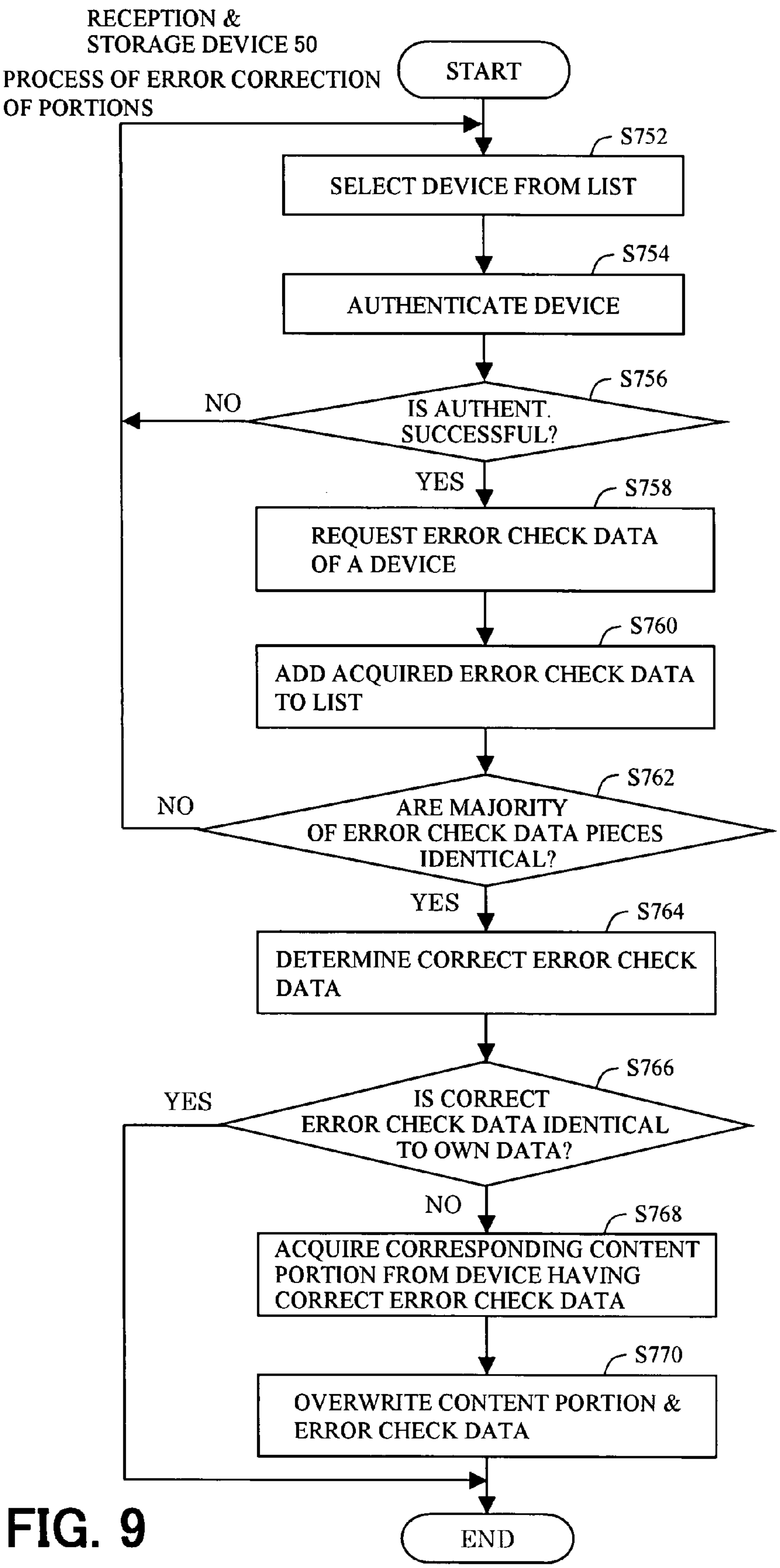
FIG. 9 shows a flow chart of an error correction process (Step 712 in FIG. 8) of each data portion, which is executed by the processor of each of the reception and storage devices.

FIG. 9 shows a flow chart of an error correction process (Step 712 in FIG. 8) of each data portion, which is executed by the processor 506 of each of the reception and storage devices 50-54.

At Step 752, from the list of reception and storage devices acquired from the management node 30, the processor 506 of the reception and storage device 50 selects one or more of the other reception and storage devices to be used for the error correction process. The selected one or more reception and storage devices preferably have a wider storage range which can be used for error correction. At Step 754, the processor 506 connects over the network 5 to the selected one or more reception and storage devices and performs mutual authentication with them. At Step 756, the processor 506 determines whether the authentication of the selected one or more reception and storage devices is successful. If it is determined that the authentication of all of the selected devices is unsuccessful, the procedure returns to Step 752. At Step 752, another one or more of the reception and storage devices are selected.

If it is determined at Step 756 that the authentication is successful for any of the selected devices, the processor 506 at Step 758 makes a request to one of the reception and storage devices for error check data for a particular storage range (e.g., a time stamp of 20000) through the network interface 504, then receives error check data for the storage range through the network interface 504, and at Step 760 adds the received error check data to the list.

At Step 762, the processor 506 determines, for the same, particular storage range of corresponding content data portions in the list and in the reception/storage device 50, whether a predetermined threshold percentage (e.g., a half or a majority) or more of the corresponding pieces of error check data and/or a predetermined threshold number or more of corresponding pieces of error check data for the same storage range are identical to each other or the same among the different reception and storage devices. If it is determined that a predetermined threshold percentage or number or more of the pieces of error check data are not identical, the procedure returns to Step 752, at which the processor 506 acquires a further piece of error check data for the same storage range of a corresponding content data portion from a further one of the reception and storage devices. If it is determined at Step 762 that a predetermined threshold percentage or number or more of the pieces of error check data are identical, the processor 506 at Step 764 determines the identical error check data as correct check data. At Step 766, the processor 506 determines whether the correct check data is identical to the check data of the stored content data in the reception and storage device 50. If it is determined that the correct check data is identical to it, then the processor 506 determines that there is no error in the storage data in the reception and storage device 50, and the procedure exits the subroutine of FIG. 9.

If it is determined at Step 766 that the correct check data is not identical to it, the processor 506 at Step 768 connects through the network interface 504 over the network 5 to one or more of the reception and storage devices 51-54 having the determined correct check data, and acquires the corresponding portion of the program content data from the reception and storage devices 51-54. At Step 770, the processor 506 overwrites, with the acquired program content data portion and correct error check data, the program content data portion and error check data stored in the storage unit 520 of the reception and storage device 50. After that, the procedure exits this subroutine.

Figure 10:
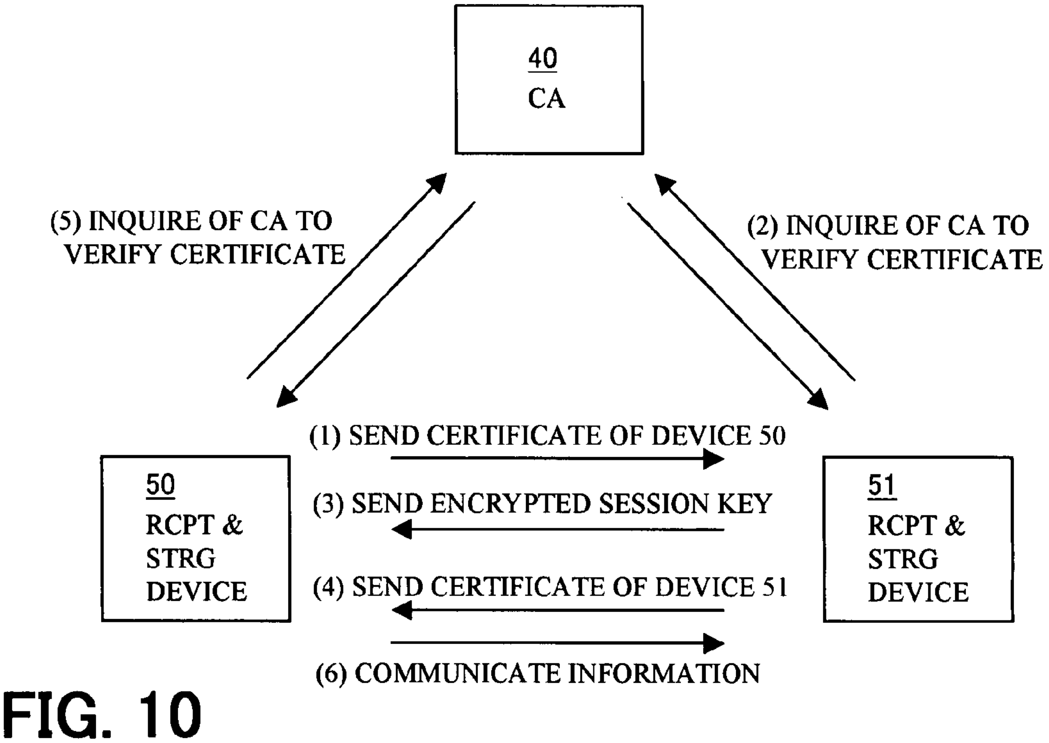
FIG. 10 shows an exemplary process of mutual authentication of the devices executed based on the PKI (Public Key Infrastructure)

FIG. 10 shows an exemplary process of mutual authentication of the reception and storage devices executed based on the PKI (Public Key Infrastructure).

In FIG. 10, first, the reception and storage device 50, which is going to check an error of a portion of program content data stored in its storage unit 520, sends its device certificate signed with a private or secret key of the reception and storage device 50 to the other reception and storage device 51 having a corresponding error check data (1), to thereby cause the reception and storage device 51 to initiate the authentication of the reception and storage device 50. In response to reception of the device certificate, the reception and storage device 51 makes an inquiry to the certificate authority (CA) 40 indicated in the device certificate to verify whether the device certificate is genuine or valid (2). If it is verified that the device certificate is genuine, the reception and storage device 51 sends, to the reception and storage device 50, a session encryption key (a common encryption key), which is encrypted with a public key of the reception and storage device 50 (3). The reception and storage device 50 sends, to the reception and storage device 51, a response encrypted with the session encryption key. The reception and storage device 51 decrypts the response with the session encryption key, and determines the reception and storage device 50 as a genuine device, if the acquired response is determined to be genuine or valid.

Subsequently, the reception and storage device 51 sends a device certificate signed with a private key of the reception and storage device 51, to the reception and storage device 50 (4), to thereby cause the reception and storage device 50 to initiate a similar process for authentication of the reception and storage device 51 (5). Thus, this process is not described again.

After the mutual authentication of the devices is completed as described above, the reception and storage devices 50 and 51 communicate information encrypted with the session encryption key (6) with each other. The reception and storage device 50 then requests the reception and storage device 51 for its error check data. Data such as a required program content data portion and error check data is encrypted with the session encryption key for transmission. Alternatively, such a program content data portion and the like may be encrypted with a public key and decrypted by a private key paired with the public key.

Figure 11:
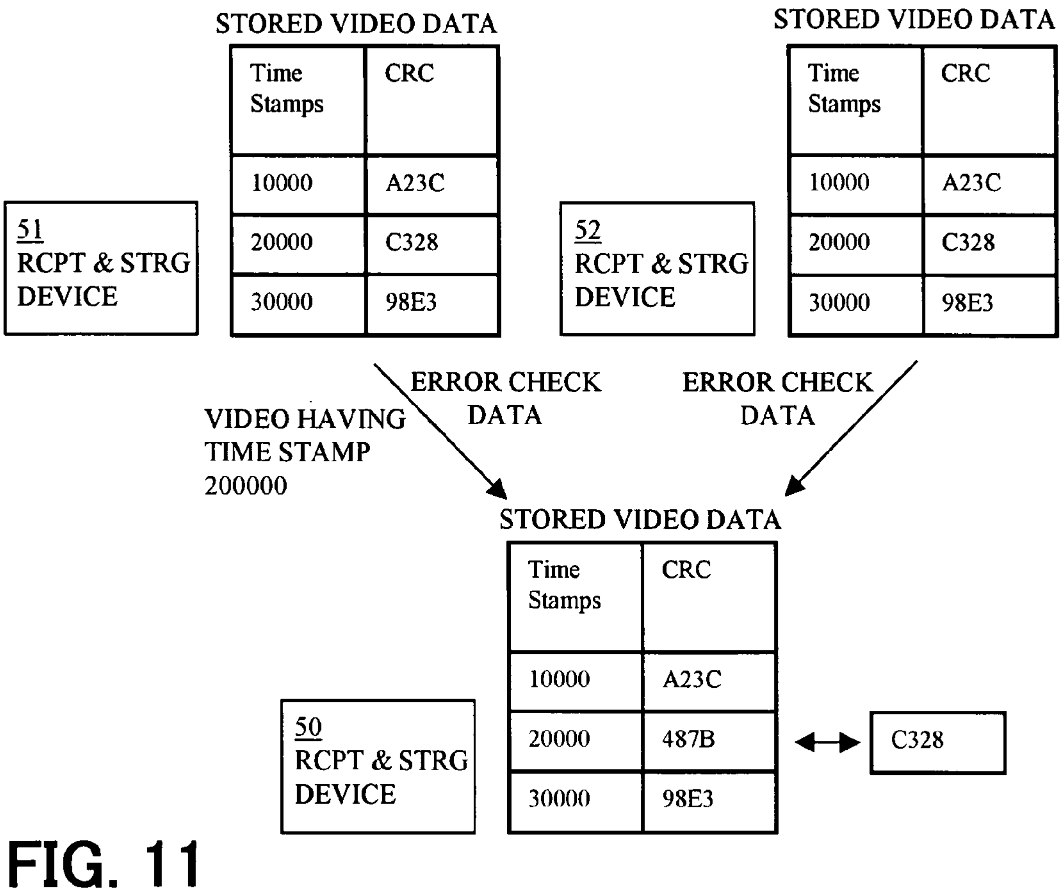
FIG. 11 shows an exemplary error check or correction process executed by the reception and storage device.

FIG. 11 shows an exemplary error check or correction process executed by the reception and storage device 50.

In FIG. 11, the reception and storage device 50 acquires, from the reception and storage device 51, pieces of error check data for different portions of the storage program video data that have time stamps of 10000, 20000, and 30000. The reception and storage device 50 compares the acquired pieces of error check data with the corresponding pieces of error check data for the reception and storage device 50, and further acquires, from a further reception and storage device 52, a corresponding piece of error check data for the time stamp (e.g., 20000) for which the acquired piece of error check data (e.g., C328) is not identical to the corresponding error check data for the reception and storage device 50 (e.g., 487B). The reception and storage device 50 compares the three corresponding pieces of error check data for the other reception and storage devices 51 and 52 and for the reception and storage device 50, for the same time stamp. If a majority or two of the corresponding pieces of error check data (e.g., C328) of the other reception and storage devices 51 and 52 are identical to each other, the reception and storage device 50 determines that its own error check data (e.g., 487B) for this time stamp is erroneous.

The reception and storage device 50 acquires a corresponding data portion having this time stamp and the associated correct error check data from the reception and storage device 51, and overwrites its own data portion and associated error check data having the time stamp with the acquired data portion and associated correct error check data. The data portion sent from the reception and storage device 51 to the reception and storage device 50 is typically encrypted with a public key issued by the management node 30, and then decrypted with a private key paired with the public key also issued by the management node 30.

Figure 12:
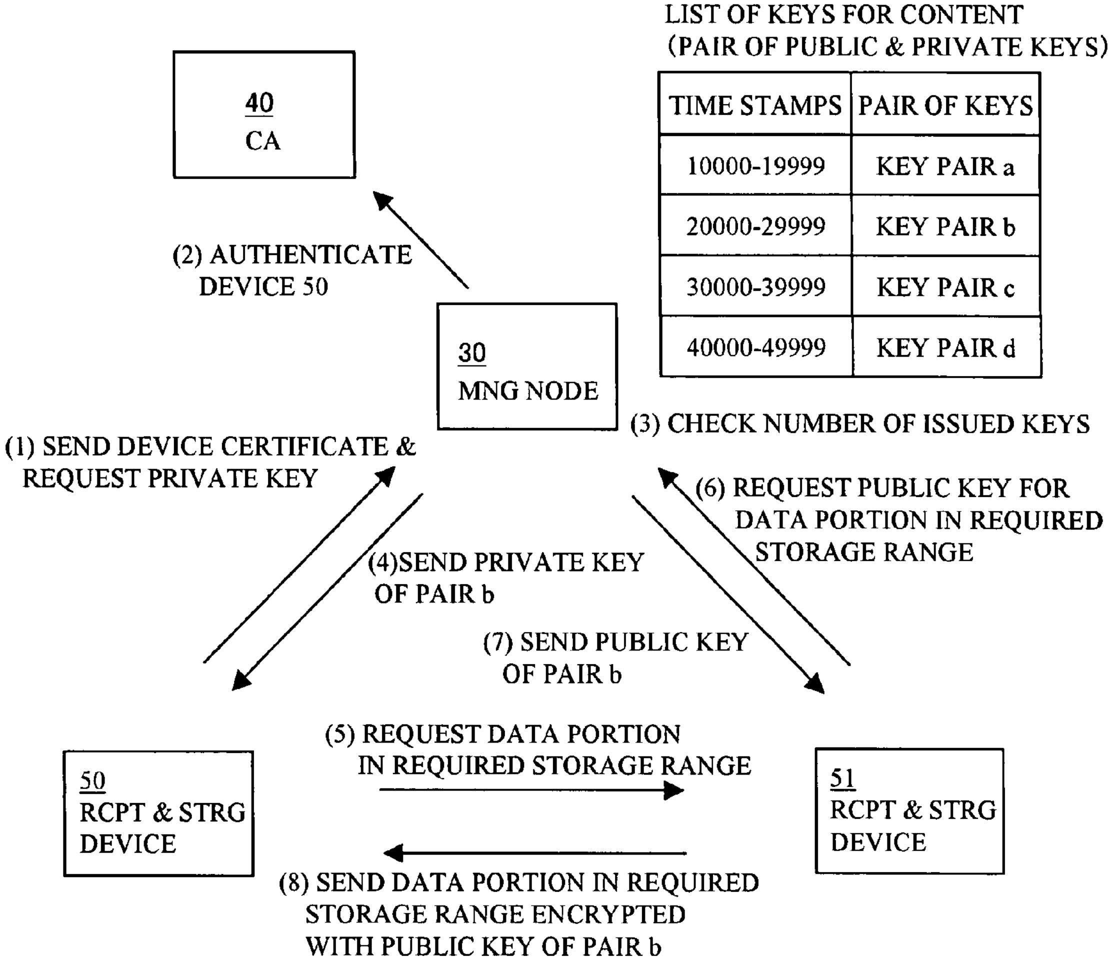
FIG. 12 shows a process for requesting the management node to issue an encryption key, which is executed by the reception and storage device, before making a request to the other reception and storage device for a portion of program content data.

FIG. 12 shows a process for requesting the management node 30 to issue an encryption key, before making a request to the other reception and storage device 51 for a portion of the program content data, which is executed by the reception and storage device 50.

The reception and storage device 50 sends, to the management node 30, a device certificate signed with a private key of the reception and storage device 50, and makes a request to the management node 30 for a private key for a portion of the program content data having time stamps (e.g., 20000 to 29999) within a required storage range (1). The management node 30 makes an inquiry to the certificate authority (CA) 40 recorded in the received device certificate to verify whether the device certificate is genuine or valid (2). If it is verified that the device certificate is genuine, the management node 30 checks the number of keys or pairs of keys issued to the reception and storage device 50, and determines whether the number transcends a predetermined threshold value (3). If it is determined that it transcends the predetermined threshold value, the management node 30 inhibits itself from issuing a new encryption key to the reception and storage device 50, and then sends an error message back to the reception and storage device 50. If it is determined that the number of keys or pairs of keys does not transcend the predetermined threshold value, the management node 30 counts up by one or increments the number of issued keys or issued pairs of keys, then generates a pair b of public and private keys, and then sends the private key to the reception and storage device 50 (4).

In response to reception of the private key, the reception and storage device 50 makes a request to the reception and storage device 51 for the portion of the program content data having time stamps (e.g., 20000 to 29999) within the required storage range (5). In response to this request, the reception and storage device 51 makes a request to the management node 30 for a public key for the portion of the program content data having these time stamps (6). In response to this request, the management node 30 sends the public key of the generated pair b of public and private keys to the reception and storage device 51 (7). In response to reception of the public and private keys, the reception and storage device 51 encrypt the requested portion of the program content data having the required time stamps with the public key, and then sends the encrypted data portion back to the reception and storage device 50 (8).

The limitation of the number of pairs of the keys to be issued to such a predetermined threshold value as described above prevents the error correction process performed by one reception and storage device from illegal or unauthorized accessing to an entire program of content data, whereby a copyright to the program of content data is protected. Such a predetermined threshold value for one reception and storage device may be set to be, for example, not more than one half of each program of content data in the storage range for each entire program, for a predetermined period of time, such as two weeks.

Figure 13:
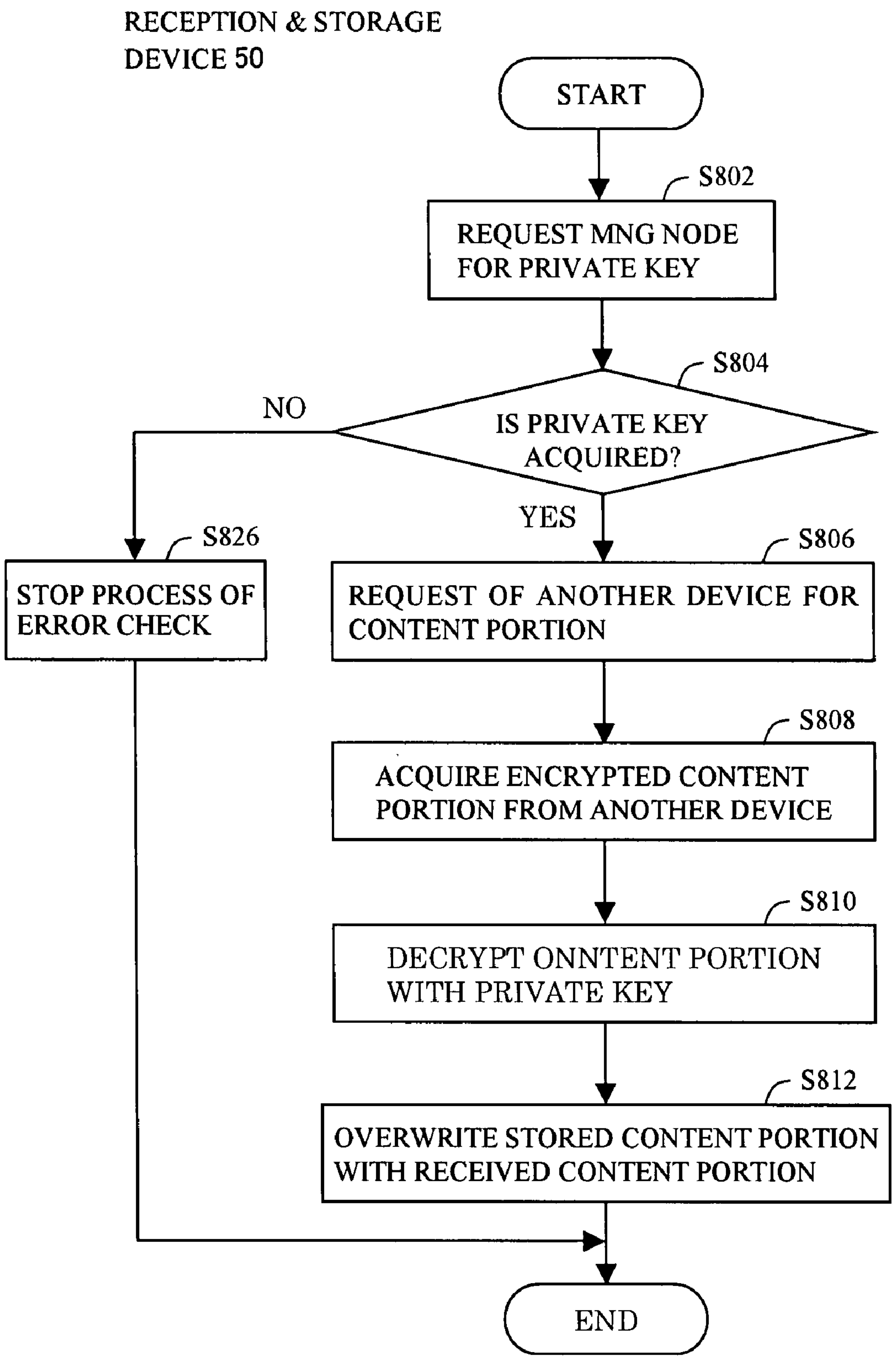
FIG. 13 shows a flow chart of a process for acquiring an encrypted portion of the program content data for the error correction from the other reception and storage device, which is executed by the processor of the first reception and storage device in FIG. 12.

FIG. 13 shows a flow chart of a process for acquiring an encrypted portion of the program content data for the error correction from the other reception and storage device 51, which is executed by the processor 506 of the reception and storage device 50 in FIG. 12.

Referring to FIG. 13, at Step 802, the processor 506 of the reception and storage device 50 sends its device certificate through the network interface 504 over the network 5 to the management node 30, and requests an encryption key or a private key for a portion of program content data having the required storage range. At Step 804, the processor 506 determines whether it acquires the private key. If it is determined that no private key has been acquired, the error correction process is aborted at Step 826. If it is determined that the private key is acquired, the processor 506 at Step 806 makes a request to the other reception and storage device 51 for a portion of program content data having the required storage range, through the network interface 504 over the network 5.

At Step 808, the processor 506 acquires, from the reception and storage device 51, a data portion encrypted with a public key having the required storage range. At Step 810, the processor 506 decrypts the received data portion and error check data with the private key. At Step 812, the processor 506 overwrites its stored data portion with the decrypted received correct data portion, and overwrites its error check data with the decrypted received correct error check data.

Figure 14:
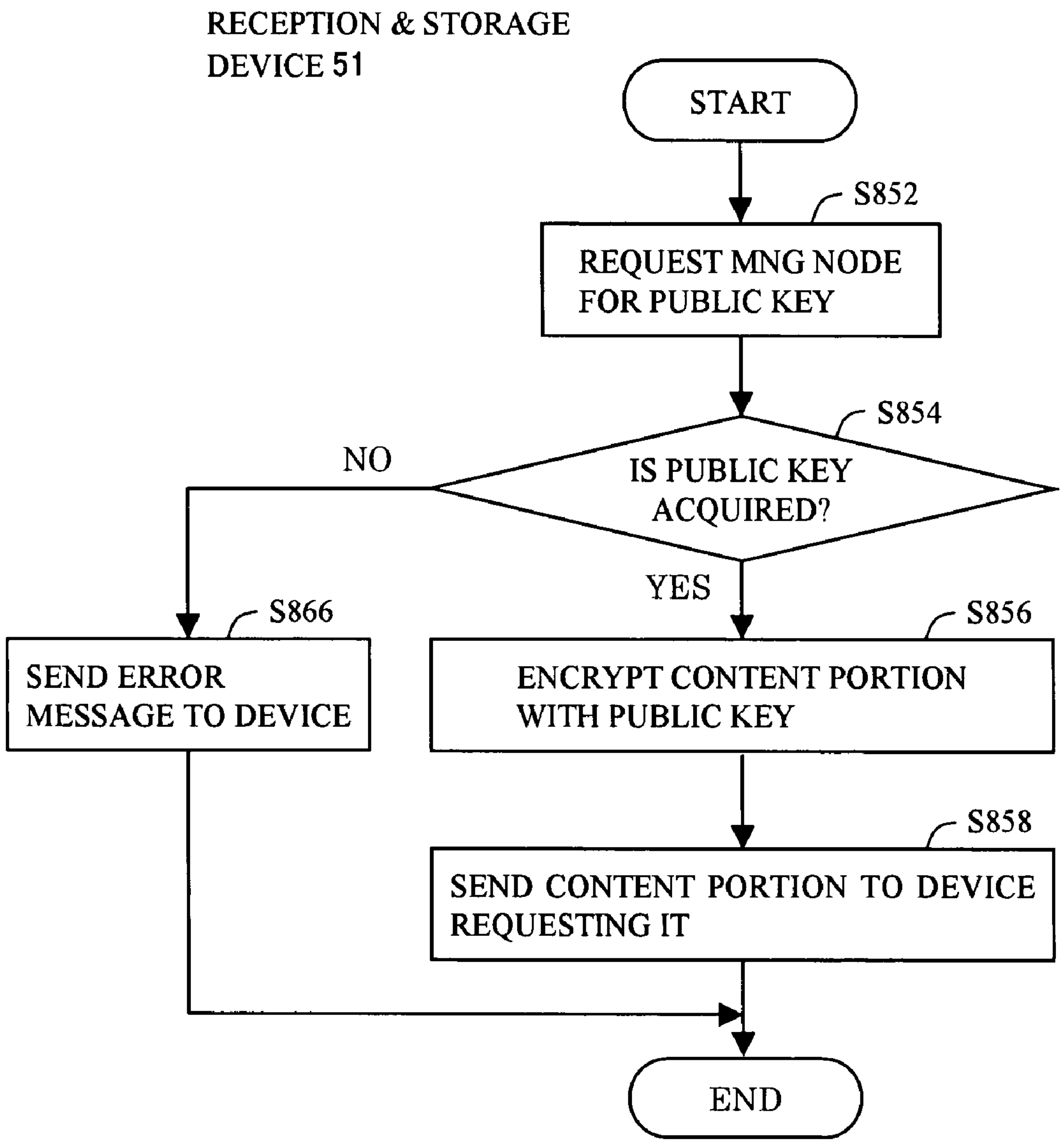
FIG. 14 shows a flow chart of a process for sending an encrypted portion of program content data to the reception and storage device, which is executed by the processor of the other reception and storage device in FIG. 12.

FIG. 14 shows a flow chart of a process for sending an encrypted portion of program content data to the reception and storage device 50, which is executed by the processor 506 of the other reception and storage device 51 in FIG. 12.

In response to a request by the reception and storage device 50 for a portion of program content data, the processor 506 of the reception and storage device 51 at Step 852 makes a request to the management node 30 for a public key as an encryption key for a portion of the program content data having the required storage range, through the network interface 504 over the network 5. At Step 854, the processor 506 determines whether a public key is acquired. If it is determined that no public key is acquired, the processor 506 at Step 866 sends an error message to the reception and storage device 50.

If it is determined at Step 854 that a public key is acquired, the processor 506 at Step 856 encrypts the data portion having the required storage range with the received public key, and at Step 858 sends the encrypted data portion back to the reception and storage device 50 through the network interface 504 over the network 5.

Figure 15:
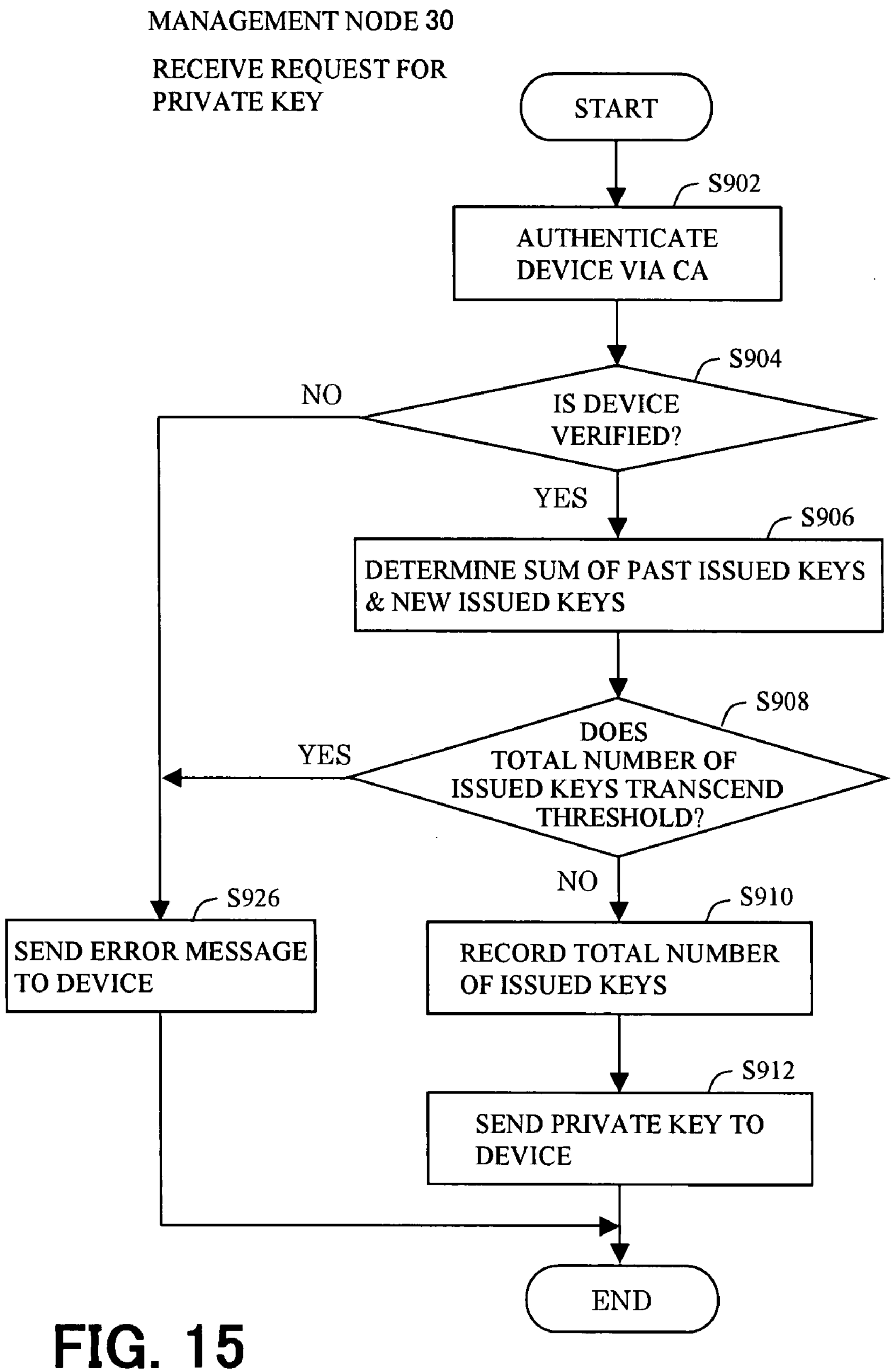
FIG. 15 shows a flow chart of a process for issuing a pair of a private key and a public key, which is executed by the processor of the management node in FIG. 12.

FIG. 15 shows a flow chart of a process for issuing a pair of a private key and a public key, which is executed by the processor 306 of the management node 30 in FIG. 12.

At Step 902, the processor 306 of the management node 30 makes an inquiry to the certificate authority 40 to verify whether a device certificate sent from the reception and storage device 50 is genuine or valid. At Step 904, the processor 306 determines whether the reception and storage device 50 is genuine. If it is determined that the reception and storage device 50 is not genuine, the processor 306 at Step 926 sends an error message to the reception and storage device 50.

If it is determined at Step 904 that the reception and storage device 50 is genuine, the processor 306 at Step 906 calculates the sum of the number of encryption keys or pairs of encryption keys which have been issued to the reception and storage device 50, and the number of encryption keys or pairs of encryption keys to be newly issued to the reception and storage device 50 at this time. At Step 908, the processor 306 determines whether the sum transcends a predetermined threshold value. If it is determined that the sum transcends the predetermined threshold value, the processor 306 at Step 926 sends an error message to the reception and storage device 50. If it is determined that the sum does not transcend the predetermined threshold value, the processor 306 at Step 910 records the sum of the numbers of the encryption keys or the pairs of encryption keys issued to the reception and storage device 50, and at Step 912 generates a pair of public and private keys, and sends the private key to the reception and storage device 50 through the network interface 304 over the network 5.

Figure 16:
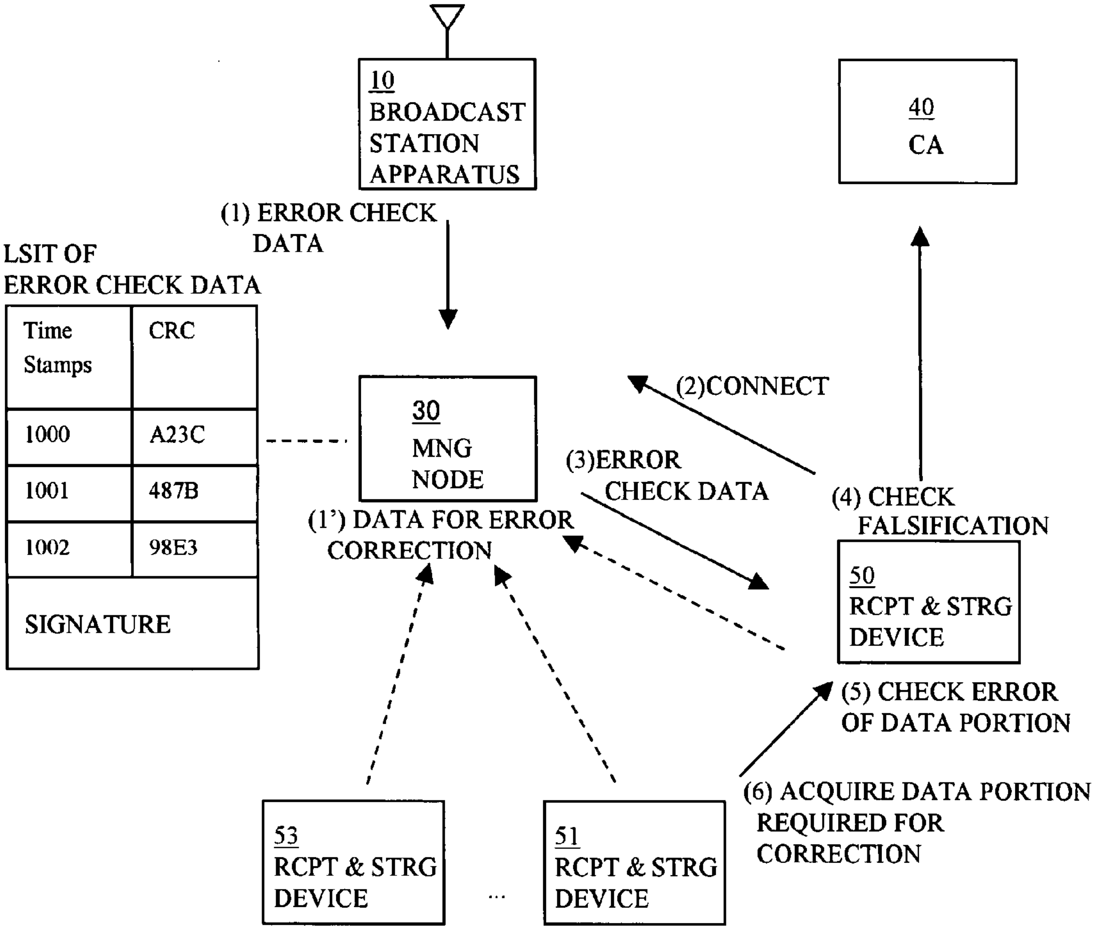
FIG. 16 shows a process for acquiring error check data by the management node, and providing the error check data from the management node to the reception and storage device.

FIG. 16 shows a process for acquiring error check data by the management node 30, and providing the error check data from the management node 30 to the reception and storage device 50.

The management node 30 acquires a list of error check data for all portions of each of programs of broadcast content data in all the storage ranges for each program, from the broadcast station apparatus 10 or the reception and storage devices 50-54 (1, 1'). The list of error check data acquired from the broadcast station apparatus 10 contains error check data for all the portions of the original programs of broadcast content data. The lists of corresponding pieces of error check data acquired from the reception and storage devices 50-54 are compared with each other by the management node 30 (the processor 306). If corresponding pieces of error check data having the same storage range (time stamp) are not identical, the number of identical pieces of error check data that accounts for a majority or largest number in the list of pieces of error check data is determined to be correct. The list of corresponding pieces of error check data provided by the broadcast station apparatus 10 and the management node 30 is signed with the private key.

When the reception and storage device 50 is connected to the management node 30 and sends storage information to it as shown in FIG. 5, the reception and storage device 50 receives information from the management node 30, and detects the presence of a list of pieces of error check data (2). For error check of a data portion, the reception and storage device 50 acquires the list of pieces of error check data from the management node 30 (3). When a predetermined period of time (e.g., two weeks) has passed since the broadcast date and time or the time stamp of the program content data, the management node 30 discards the list and stops providing the list.

Subsequently, the reception and storage device 50 makes an inquiry to the certificate authority 40 to acquire a public key from it, and decrypts the list of pieces of error check data with the public key, and verifies whether the list of pieces of error check data is genuine, i.e., whether the list of error check data is falsified or maliciously changed (4). If it is determined that the list is genuine, the reception and storage device 50 compares a piece of error check data for each portion of the program content data having a particular storage range stored in its storage unit 520, with a corresponding piece of error check data having the particular storage range in the list (5). If an error is found in the error check data for a particular data portion stored in the reception and storage device 50, the reception and storage device 50 acquires a corresponding portion of the program content data having correct error check data from the other reception and storage device 51 (6).

Figure 17:
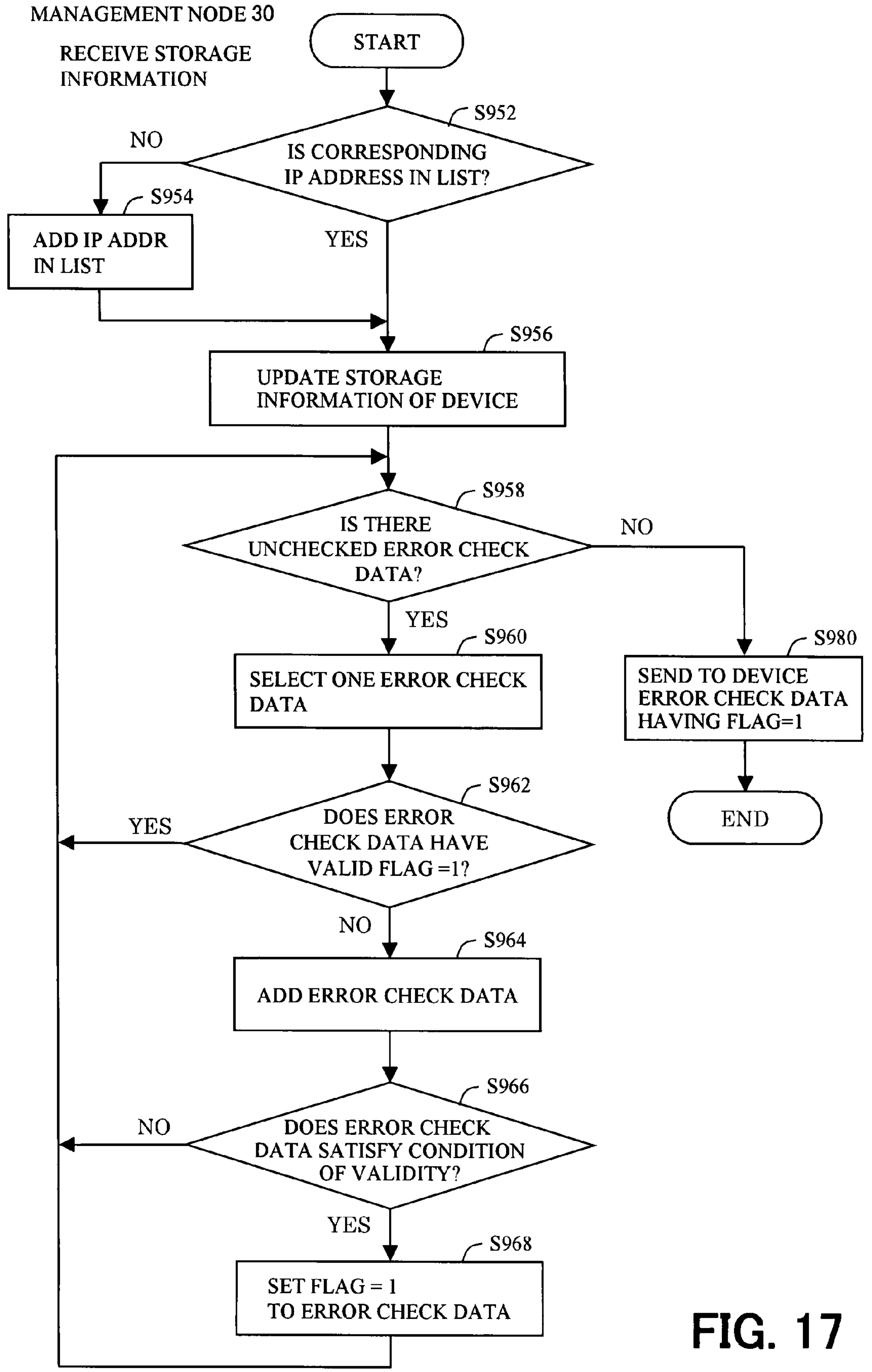
FIG. 17 shows a flow chart of a process for acquiring error check data from the reception and storage devices and determining a list of error check data, which is executed by the processor of the management node.

FIG. 17 shows a flow chart of a process for acquiring error check data from the reception and storage devices 50-54 and determining a list of error check data, which is executed by the processor 306 of the management node 30.

In response to the reception of storage information from the reception and storage device 50 for example, the processor 306 of the management node 30 at Step 952 determines whether the IP address of the reception and storage device 50 as a source address is present in the list of reception and storage devices. If it is determined that it is not present in the list, the processor 306 at Step 954 adds the IP address to the list. After that, the procedure proceeds to Step 956. If it is determined that the IP address is present in the list, the procedure proceeds to Step 956. At Step 956, the processor 306 adds or updates the storage information of the reception and storage device 50 in the list.

At Step 958, the processor 306 determines whether unchecked error check data is present in the storage unit 320. If it is determined that the unchecked error check data is present, the processor 306 at Step 960 selects one piece of error check data for a particular storage range from the received error check data, and determines at Step 962 whether a corresponding error check data in the list for the particular storage range has a flag=1 indicative of correct data. If it is determined that a corresponding error check data in the list has the flag=1, the procedure returns to Step 958. If it is determined that a corresponding error check data in the list does not have the flag=1, the management node 30 (the processor 306) at Step 964 adds the selected received piece of error check data to a group of corresponding pieces of error check data for the same particular storage range or time stamp as the selected received piece of error check data has.

At Step 966, the management node 30 (the processor 306) determines whether the group of pieces of error check data for the data portion having the same particular storage range or time stamp as the added piece of error check data has satisfies a condition for validity or relevancy. This condition may be a requirement that a predetermined number (e.g., 5) or more of the identical pieces of error check data and/or a predetermined percentage (e.g., 60%) or more of the identical pieces of error check data are found in this group. If it is determined that this condition is not satisfied, the procedure returns to Step 958. If it is determined that this condition is satisfied, the management node 30 (the processor 306) at Step 968 sets the flag=1 in one identical piece of error check data which is determined to satisfy the condition for validity. Thus, the error check data having the storage range or time stamp in the list is determined. After that, the procedure returns to Step 958. By repeating Steps 952-968, a list of error check data for all of the portions of the broadcast program content data is determined.

If it is determined at Step 958 that unchecked error check data is not present in the list, the processor 306 at Step 980 sends the determined list of error check data or the determined pieces of error check data having the flag=1 in the received storage ranges to one or more of the reception and storage devices 50-54 which have sent the storage information having the storage ranges, through the network interface 304 over the network 5.

Although the invention has been described above in connection with the reception of a broadcast content program carried by an RF signal, it should be understood that the invention is also applicable to reception of a content program for distribution over a network, such as an optical fiber network or a cable television (CATV) network.

The steps of the flow charts of FIGS. 6-9, 13-15 and 17 may be implemented also in the form of hardware components or elements.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. A system for receiving and storing broadcast content data, the system comprising a plurality of reception and storage devices which receive and store broadcast content data, each of the reception and storage devices including: a receiver which receives the broadcast content data, a processor, a storage unit which stores the received broadcast content data, and a communication unit, wherein each of the reception and storage devices receives at least a portion of the broadcast content data and stores the received data portion in the storage unit, and then generates a first piece of error check data for the received data portion and stores the generated first piece of error check data in association with the received data portion in the storage unit, and one of the reception and storage devices, under the control of the processor thereof, requests and receives, from each of other one or more of the reception and storage devices over the network, a respective piece of error check data for a portion of the broadcast content data corresponding to the data portion stored in the storage unit, and compares the first piece of error check data and the one or more received pieces of error check data with each other and determines that the first piece of error check data is valid, if more than a threshold number of pieces of error check data that are generated by ones of the reception and storage devices are identical to the first piece of error check data and/or if more than a threshold percentage of pieces of error check data that are generated by ones of the reception and storage devices are identical to the first piece of error check data.

2. The system according to claim 1, wherein the broadcast content data is audio data, video data and associated information data, and the received data portion is a portion of the audio data, video data or associated information data.

3. The system according to claim 1, wherein, before the one reception and storage device receives the corresponding data portion from the other one reception and storage device, the one reception and storage device is authenticated by the other one reception and storage device, and the other one reception and storage device is authenticated by the one reception and storage device.

4. The system according to claim 1, wherein the system further comprises a management device which is connected to the network and manages storage information of the plurality of reception and storage devices, after the one reception and storage device receives the data portion and stores the received data portion in the storage unit, the one reception and storage device sends, to the management device, storage information indicative of a storage range of the received data portion, the one reception and storage device, under the control of the processor thereof, acquires, from the management device over the network, an IP address of the other one reception and storage device which stores the corresponding data portion, and connects over the network to the other one reception and storage device at the acquired IP address.

5. The system according to claim 4, wherein the storage range is indicated by a time stamp.

6. The system according to claim 4, wherein the one reception and storage device and the other one reception and storage device receive respective encryption keys from the management device, the data portion to be received by the one reception and storage device from the other one reception and storage device is encrypted by the other one reception and storage device with the encryption key generated by the management device, and the encrypted data portion is decrypted by the one reception and storage device with the encryption key generated by the management device, and the management device generates different encryption keys for portions of the broadcast content data in respective storage ranges, and the total number of encryption keys provided to the one reception and storage device for the broadcast content data is limited.

7. The system according to claim 4, wherein the management device stores error check data as part of storage information of the plurality of reception and storage devices in association with the storage range, determines a correct piece of error check data for the data portion based on the threshold number or more and/or the threshold percentage or more of identical pieces of error check data for a portion of the broadcast content data having a particular storage range received from the plurality of reception and storage devices, and generates a list of correct pieces of error check data for portions of the broadcast content data in storage ranges of the data portions, and the one reception and storage device receives the list of correct pieces of error check data from the management device.

8. The system according to claim 1, wherein the one reception and storage device further receives the corresponding data portion associated with the second valid piece of error check data from another one of the plurality of reception and storage devices, if the first piece of error check data is determined to be invalid, and corrects the stored data portion in the storage unit based on the received corresponding data portion.

9. A reception and storage device, which is connected to a plurality of other reception and storage devices over a network, and receives and stores broadcast content data, the first reception and storage device comprising:

a receiver which receives the broadcast content data, a storage unit which stores the received broadcast content data, a communication unit, and a processor which allows the receiver to receive at least a portion of the broadcast content data, stores the received data portion in the storage unit, then generates a first piece of error check data for the received data portion, and stores the generated first piece of error check data in association with the received data portion in the storage unit, and which processor further requests and receives, from each of other one or more of the reception and storage devices over the network, a respective piece of error check data for a portion of the broadcast content data corresponding to the data portion stored in the storage unit, and compares the first piece of error check data and the one or more received pieces of error check data with each other and determines that the first piece of error check data is valid, if more than a threshold number of pieces of error check data that are generated by ones of the reception and storage devices are identical to the first piece of error check data and/or if more than a threshold percentage of pieces of error check data that are generated by ones of the reception and storage devices are identical to the first piece of error check data.

10. The reception and storage device according to claim 9, wherein the broadcast content data is audio data, video data and associated information data, and the received data portion is a portion of the audio data, video data or associated information data.

11. The reception and storage device according to claim 9, wherein, after the data portion is received and stored in the storage unit, the processor sends storage information indicative of a storage range of the data portion, over the network to a management device which manages storage information, and the processor further acquires, from the management device over the network, an IP address of the other one reception and storage device which stores the corresponding portion, and connects the communication unit over the network to the other one reception and storage device at the acquired IP address.

12. The reception and storage device according to claim 11, wherein the processor receives an encryption key from the management device, the received data portion to be received from the other one reception and storage device is encrypted, and the received encrypted data portion is decrypted by the processor with the encryption key.

13. The reception and storage device according to claim 11, wherein the processor further sends, to the management device, error check data as part of the storage information, and the processor further receives, from the management device, a list of correct pieces of error check data for data portions in storage ranges.

14. The reception and storage device according to claim 9, wherein the processor further causes the communication unit to receive the corresponding data portion associated with the valid piece of error check data from another one of the reception and storage devices, if the first piece of error check data is determined to be invalid, and corrects the stored data portion in the storage unit based on the received corresponding data portion.

15. An information processing device, which is connectable to a plurality of reception and storage devices over a network and manages storage information of the plurality of reception and storage devices, the information processing device comprising:

a storage unit, a communication unit, and a processor which receives, from the plurality of reception and storage devices, storage ranges of portions of broadcast content data and pieces of error check data for the respective data portions having the respective storage ranges, and stores them in the storage unit, wherein the processor compares pieces of error check data, with each other, for a same portion of the broadcast content data having a particular storage range that are received from the plurality of reception and storage devices and stored in the storage unit, the processor determines, as a correct piece of error check data, one of the pieces of error check data for the same portion that is identical to more than a threshold number of pieces of error check data for the same portion and/or more than a threshold percentage of pieces of error check data for the same portion, generates a list of the storage ranges and correct pieces of error check data, and sends the list in response to a request by one of the reception and storage devices, and in response to a request by one of the reception and storage devices, the processor generates an encryption key, and sends the generated encryption key to the one reception and storage devices.

16. A non-transitory computer-readable storage medium storing a program thereon for use in a reception and storage device which is connectable to a plurality of other reception and storage devices over a network and receives and stores broadcast content data, the first reception and storage device comprising: a receiver which receives the broadcast content data, a processor, a storage unit which stores the received broadcast content data, and a communication unit, the program is operable to effect:

allowing the receiver to receive at least a portion of the broadcast content data, storing the received data portion in the storage unit, and generating first piece of error check data for the received data portion and storing the generated a first piece of error check data in association with the data portion in the storage unit, requesting and receiving, from each of other one or more of the reception and storage devices over the network, a respective piece of error check data of a portion of the broadcast content data corresponding to the data portion stored in the storage unit, and comparing the first piece of error check data and the one or more received pieces of error check data with each other and determines that the first piece of error check data is valid, if more than a threshold number of pieces of error check data that are generated by ones of the reception and storage devices are identical to the first piece of error check data and/or if more than a threshold percentage of pieces of error check data that are generated by ones of the reception and storage devices are identical to the first piece of error check data.

17. The non-transitory computer-readable storage medium according to claim 16, wherein the program is operable to further effect: causing the communication unit to receive the corresponding data portion associated with the valid piece of error check data from another one of the reception and storage devices, if the first piece of error check data is determined to be invalid, and then correcting the stored data portion in the storage unit based on the received corresponding data portion.

* * * * *